(12) United States Patent
Welle et al.

(10) Patent No.: US 12,352,612 B2
(45) Date of Patent: *Jul. 8, 2025

(54) LEVEL MEASURING INSTRUMENT WITH RADAR SYSTEM ON CHIP

(71) Applicant: VEGA GRIESHABER KG, Wolfach (DE)

(72) Inventors: Roland Welle, Hausach (DE); Joerg Boersig, Schapbach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,185

(22) Filed: Feb. 24, 2023

(65) Prior Publication Data

US 2023/0221164 A1    Jul. 13, 2023

Related U.S. Application Data

(63) Continuation of application No. 16/753,586, filed as application No. PCT/EP2017/075530 on Oct. 6, 2017, now Pat. No. 11,619,537.

(51) Int. Cl.
*G01F 23/284* (2006.01)
*G01F 23/2962* (2022.01)
(Continued)

(52) U.S. Cl.
CPC ........ *G01F 23/284* (2013.01); *G01F 23/2962* (2013.01); *G01F 23/802* (2022.01); *G01S 7/032* (2013.01); *G01S 13/88* (2013.01)

(58) Field of Classification Search
CPC ........ G01S 13/88; G01S 7/032; G01F 23/284; G01F 23/802; G01F 2119/10; G01F 17/18; G01R 29/26
See application file for complete search history.

(56) References Cited

U.S. PATENT DOCUMENTS

| 2,595,358 A | 5/1952 | Herbst |
| 6,414,625 B1 * | 7/2002 | Kleman ................. G01S 13/88 342/124 |

(Continued)

FOREIGN PATENT DOCUMENTS

| DE | 2011 056963 B3 | 9/2012 |
| DE | 2015 219 612 A1 | 4/2017 |

(Continued)

OTHER PUBLICATIONS

International Search Report issued on Jun. 14, 2018 in PCT/EP2017/075530 filed on Oct. 6, 2017, 3 pages.

(Continued)

*Primary Examiner* — Nathaniel J Kolb
(74) *Attorney, Agent, or Firm* — Oblon, McClelland, Maier & Neustadt, L.L.P.

(57) ABSTRACT

A level measuring instrument is provided, including a microwave integrated circuit in a form of a radar system on chip with at least two transmission hardware channels, each to generate a transmission signal, and at least two receiving hardware channels, each to receive reflected signals from a product surface; a noise level reduction device configured to increase a signal-to-noise ratio of a received signal, which relates to the reflected signals from the product surface, by averaging results of several measurements carried out in succession in time; or a signal level increasing device configured to combine, by an inverse Wilkinson divider, two of the transmission hardware channels to produce a combined transmission signal with increased power or to combine two of the receiving channels to produce a combined reception signal with increased power.

11 Claims, 7 Drawing Sheets

(51) Int. Cl.
*G01F 23/80* (2022.01)
*G01S 7/03* (2006.01)
*G01S 13/88* (2006.01)

(56) References Cited

U.S. PATENT DOCUMENTS

| | | |
|---|---|---|
| 9,287,824 B2 | 3/2016 | Pohl |
| 9,395,229 B2 | 7/2016 | Jirskog et al. |
| 2007/0186678 A1 | 8/2007 | Griessbaum et al. |
| 2008/0083281 A1* | 4/2008 | Rolfes .................. G01F 23/284 73/627 |
| 2009/0079621 A1 | 3/2009 | Grafmueller et al. |
| 2010/0231452 A1* | 9/2010 | Babakhani ........... H01Q 19/065 343/753 |
| 2012/0010838 A1* | 1/2012 | Wenger .................. G01F 25/10 702/89 |
| 2015/0253176 A1* | 9/2015 | Jirskog .................... G01S 7/35 342/124 |
| 2017/0030759 A1 | 2/2017 | Griessbaum et al. |
| 2017/0059691 A1* | 3/2017 | Fischer ................ G01F 23/284 |
| 2018/0101184 A1* | 4/2018 | Shock .................... G01S 7/003 |
| 2018/0328774 A1 | 11/2018 | Welle et al. |
| 2019/0383902 A1* | 12/2019 | Yeo ....................... G01F 23/284 |

FOREIGN PATENT DOCUMENTS

| | | |
|---|---|---|
| EP | 2 770 308 A1 | 8/2014 |
| EP | 3 139 139 A1 | 3/2017 |
| EP | 3 182 505 A1 | 6/2017 |
| EP | 3 401 651 A1 | 11/2018 |
| WO | WO-2015095858 A2 * | 6/2015 ......... E21B 41/0085 |

OTHER PUBLICATIONS

English translation of the International Preliminary Report on Patentability issued on Apr. 16, 2020 in PCT/EP2017/075530 filed Oct. 6, 2017, 8 pages.

Arzu Ergintav, et al., "A 61 GHz Frequency Synthesizer in SiGe BiCMOS for 122 Ghz FMCW Radar" Proceedings of the 11th European Microwave Integrated Circuits Conference, 2016, pp. 325-328.

European Office Action issued Mar. 28, 2022 in European Patent Application No. 17 780 734.4, 3 pages.

* cited by examiner

LEVEL MEASURING INSTRUMENT WITH RADAR SYSTEM ON CHIP

CROSS-REFERENCE TO RELATED APPLICATIONS

This application is a continuation of and claims benefit under 35 U.S.C. § 120 to U.S. application Ser. No. 16/753,586, filed Apr. 3, 2020, which is a U.S. National Stage application of PCT/EP2017/075530, filed Oct. 6, 2017, the entire contents of each of which are incorporated herein by reference.

TECHNICAL FIELD

The invention relates to level measurement. In particular, the invention relates to a level measuring device comprising a microwave integrated circuit in form of a radar system on chip, a method for measuring a level of a medium in a container, a method for measuring a topology of a surface of a medium in a container, a program element and a computer-readable medium.

BACKGROUND

Level measurement with radar is state of the art today. In contrast to many other areas, the breakthrough for radar technology in level measurement was only possible after extremely small reflection signals could be detected and processed by the electronics of the measuring instruments.

Modern measuring instruments are not only characterized by a high transmission frequency, which can typically be in the range of 75 to 85 GHz, but are also capable of reliably processing amplitude differences of the reflected signal in a range of up to 120 dB.

This has been made possible by the use of very low-noise high-frequency circuit components, usually in the form of monolithic microwave integrated circuits (MMICs) based on gallium arsenide (GaAs). The use of GaAs components has also made it possible to increase the high frequency power available for measurement. However, a disadvantage of this solution is the increased price of the components.

SUMMARY

It is an object of the invention to provide a level measuring instrument with a microwave integrated circuit in the form of a radar system on chip suitable for level measurement.

This object is solved by the subject matter of the independent patent claims. Further developments of the invention are stated in the sub-claims and the following description.

A first aspect of the invention relates to a level measuring instrument with a microwave integrated circuit in the form of a radar system on chip. Such a radar system on chip is a highly integrated MMIC with circuit components for digital functions which, according to an embodiment, is capable of integrating the complete functionality of a radar system for signal generation, signal processing and the conversion of the received signals into a digital representation on a single radar chip.

The Radar System on Chip (RSOC) comprises several transmission channels, each of these transmission channels designed to generate a high-frequency transmit signal with a frequency in the gigahertz range, for example in the range of 75 to 85 GHz or above. One or more receiving channels can also be provided, whereby these are set up to receive in each case a transmission signal reflected on the product surface.

A noise level reduction device may be provided which is designed to increase, i.e., improve, the signal-to-noise ratio of the received signal. In this case, the received signal is the signal received by the level measuring instrument which is due to the emitted signals reflected on the product surface. The signal-to-noise ratio is increased by averaging the results of several successive measurements.

Alternatively or additionally a signal level increasing device is provided, which is arranged for combining at least two of the transmission channels to generate a combined transmission signal with increased power and/or for combining at least two of the receiving channels to generate a combined reception signal with increased reception power.

This signal level increase results in that the emitted signal has a higher overall emitted power for the same power of the level measuring instrument or the radar system on chip, so that even weaker reflecting media or objects can be reliably detected. This ultimately leads to a signal improvement.

The noise level reduction device behaves accordingly. With the same overall performance of the radar system on chip, the overall measurement result is improved because the signal-to-noise ratio is increased. This also leads to an improvement of the signal, which makes it possible to use certain radar systems on chip for level measurement, as otherwise the measuring results would not be sufficiently accurate.

According to an embodiment of the invention, the noise level reduction device is configured, after averaging the results of several measurements carried out in succession in time, to determine whether a sufficient number of measurements have been averaged to achieve a given measurement quality. If this measurement quality has not been achieved, further measurements are triggered, the results of which are also fed to the averaging device in order to further improve the measurement result by increasing the signal-to-noise ratio.

The decision as to whether a sufficient number of measurements have been averaged can be made, for example, by considering the threshold values. If the signal-to-noise ratio obtained by averaging is below a predetermined threshold value, further echo curves and/or measurement results are generated and included in the averaging process. This process can be repeated several times until the signal-to-noise ratio has the desired quality.

According to a further embodiment of the invention, the level measuring device is configured as a frequency-modulated continuous wave (FMCW) signal level measuring device, wherein each of the measurements carried out in succession in time comprises a frequency sweep, for example at a starting frequency of 75 GHz up to a maximum frequency of 85 GHz.

According to a further embodiment of the invention, the microwave integrated circuit comprises at least one integrated analog-to-digital (A/D) converter, arranged to generate the received signal in the form of a digitized intermediate frequency signal which is due to one or more transmitted signals reflected at the product surface.

According to another embodiment, the digitized intermediate frequency signals generated by the A/D converter are averaged by the noise level reduction device.

According to another embodiment of the invention, an antenna is connected to at least two (or even all) of the transmission channels. Likewise, an antenna is connected to at least two (or even all) of the receiving channels. In particular, it may be provided that certain (or all) transmitting channels are also used simultaneously as receiving channels.

According to another embodiment of the invention, the microwave integrated circuit is based on BiCMOS technology in which SiGe and CMOS circuit elements are combined.

According to another embodiment of the invention, the microwave integrated circuit is based on SiGe technology.

According to another embodiment of the invention, the microwave integrated circuit is based on HF-CMOS technology and has high-frequency circuit parts for frequencies of 75 GHz or more.

According to a further embodiment, as already mentioned, each emitting channel is also a receiving channel, equipped to receive the emitted signal reflected on the product surface.

According to a further embodiment of the invention, the level measuring instrument is configured to detect the topology of a medium in a container, i.e., it is capable of scanning the surface of the medium by digital beam forming.

Another aspect of the invention relates to a method of measuring a level of a medium in a container or a topology of a surface of the medium. A high-frequency transmission signal with a frequency of, for example, 75 GHz or more is generated.

This is performed with one of several transmission channels. The emitted signals reflected on the product surface are then received by several receiving channels. The radar systems on chip described above and below can be used for this purpose.

To increase the signal-to-noise ratio of a received signal, which is due to the emitted signals reflected at the product surface, the results of several measurements carried out one after the other in time are averaged. As an alternative or in addition, two or more of the emitting channels are combined to generate a combined emitted signal with increased power. Alternatively or additionally, two or more of the receive channels are combined to produce a combined receive signal with increased power.

A further aspect of the invention relates to a program element which, when executed on a processor of a level gauge, instructs the level gauge to perform the steps described above and below.

Another aspect of the invention relates to a computer-readable medium on which the program element described above is stored.

The properties described below with regard to the level measuring instrument can also be implemented as process steps. Conversely, all the process steps described in the following can be implemented in the level measuring instrument.

In the following, embodiments of the invention are described with reference to the figures. If the same reference signs are used in the following figure description, they denote identical or similar elements. The drawings in the figures are schematic and not to scale.

DETAILED DESCRIPTION OF EMBODIMENTS

Figure 1:
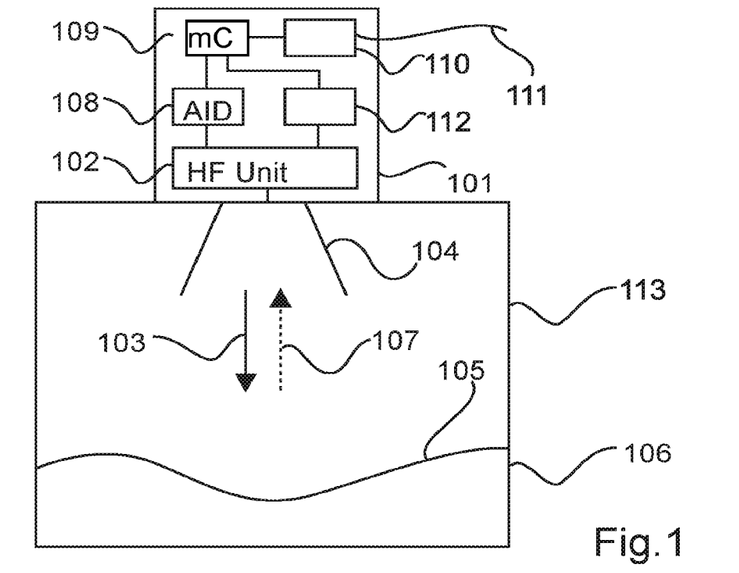
FIG. 1 shows a level measuring instrument installed in a tank.

FIG. 1 shows a level measuring instrument in the form of a level radar. The measuring device 101 generates a transmission signal 103 by means of a control circuit 112 and a high frequency circuit 102 and radiates this signal in the direction of a product surface 105 by means of an antenna 104. The product 106 reflects only a small part 107 of the energy of the emitted signal back to the level gauge. In the high frequency circuit 102, the reflected signal is converted into a low frequency intermediate frequency signal and fed to an analogue-digital converter circuit 108. This digitises the low-frequency echo signal and passes the digital values on to a signal processing circuit, for example a processor 109. Within this processor, the distance to the medium is determined according to certain procedures. The measured value determined in this way is made available to the outside world either wirelessly or by wire. Normally a so-called two-wire interface 111 is used at this point, which on the one hand supplies the sensor 101 with power and on the other hand serves to signal the measured value to the outside by setting a current value proportional to the measured value in the range between 4 . . . 20 mA within wire 111.

The transmission frequency commonly used in level radar equipment as shown in FIG. 1 is in the range of 6 GHz, 24 GHz or between 75 GHz and 85 GHz. Especially for the last mentioned frequency range, up to now unhoused GaAs semiconductor components are used, which are expensive due to the semiconductor technology itself, and which also have to be processed in series in a cost-intensive way by bonding on the circuit board.

In recent years, increased efforts have been made to realize MMIC's based on less expensive semiconductor materials. For example, MMICs based on silicon germanium (SiGe), which in comparison to gallium arsenide devices not only reduces costs but also enables the transition to higher frequencies. However, if highly integrated MMICs based on SiGe are used, which integrate most of the circuitry necessary for analog signal generation and signal processing on one chip, the noise increases (the signal-to-noise ratio becomes lower) and the maximum transmission power that can be provided by such circuitry decreases.

Whereas in earlier times it was proposed to integrate analog circuit components on a chip, embodiments of the present invention aim at using a level measuring instrument with a radar system on chip (RSOC). The integration of CMOS circuit components for digital functions makes it possible to integrate the complete functionality of a radar system for signal generation, signal processing and the transfer of the received signals into a digital representation on a single radar chip. For this purpose, SiGe and CMOS circuit elements (BiCMOS) can be combined. It has also proved possible to realize high-frequency circuit parts in specialized CMOS technology (HF-CMOS), so that the integration of digital circuit parts on the same chip up to complete processors is technically feasible, so that single-chip radar systems can be built which can be used for level measurement.

The requirements for radar systems for level measurement differ considerably from those of other applications where the accuracy of the measurement and energy efficiency are not so much important, but rather the minimization of the measurement time. An important feature of industrial level measuring instruments is that even extremely weak reflections of a bulk solid must be detected metrologically. By using GaAs MMICs with inherently low inherent noise and high emitted power, even the smallest reflection signals can be reliably processed. A significant reduction in the costs of a level radar instrument, on the other hand, can only be achieved by using low-cost semiconductor technologies (SiGe, HF-CMOS) and further integration. At first glance, the reduced emitted level and increased inherent noise of the last-mentioned technologies thus stand in the way of their use in the area of level measurement.

In the following a solution is proposed how low-cost BiCMOS and HF-CMOS based integrated radar chips can be used in industrial radar level measurement devices.

Figure 2:
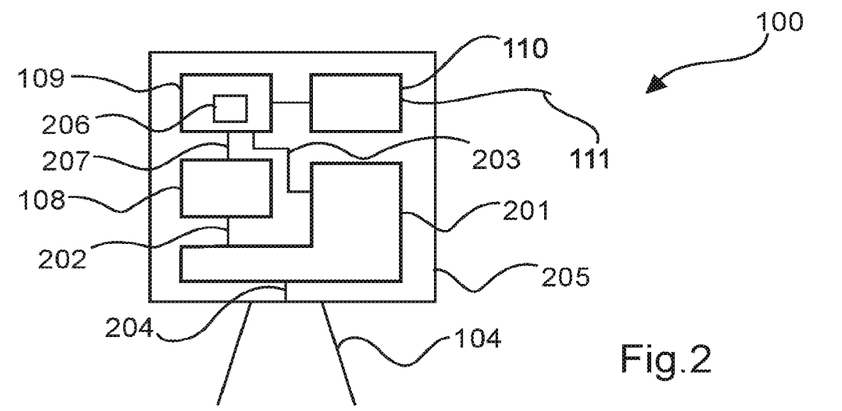
FIG. 2 shows another level measuring instrument.

FIG. 2 shows a first step to reduce the cost of a level meter 100, 205. By using components 201 based on BiCMOS or HF-CMOS, a first integration step can be taken. The control circuit 112, which, depending on the desired modulation of the transmitted signal 103, can be implemented, for example, in the form of a PLL, fractional PLL, or fractional rational PLL, and can be integrated as a digital circuit component with the integrated high-frequency circuit parts on a common IC 201.

Externally, this IC only has a high-frequency interface 204 for connecting one or more antennas 104, an analog interface 202 for reading the low-frequency intermediate frequency signals and a digital interface 203 for controlling and parameterizing the chip. Due to the omission of GaAs as a semiconductor material, the properties of such a system deteriorate in comparison with the structure of FIG. 1, both with regard to the inherent noise of the semiconductor circuitry and with regard to the maximum transmission level that can be generated, both of which result in a reduced range of the amplitude differences of the reflected echo signal that can be detected by the system.

Figure 3:
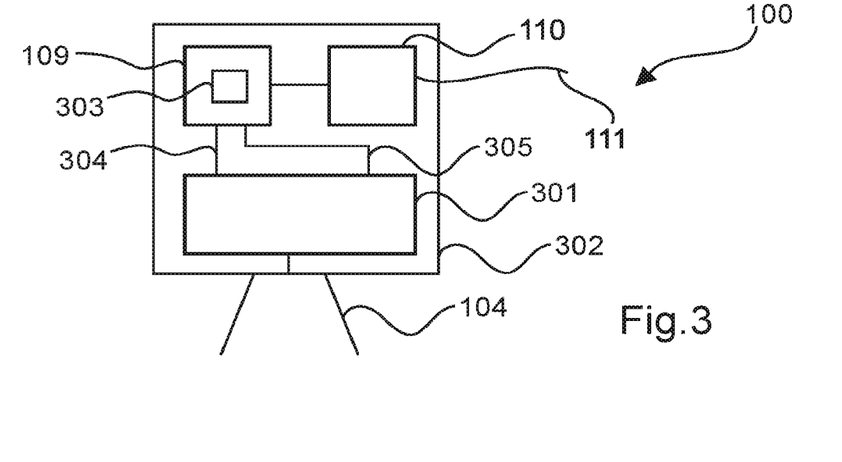
FIG. 3 shows another level measuring instrument.

FIG. 3 shows a further integration step. In addition to the high-frequency circuits 102 and the control circuit 112, the circuits for the analog-to-digital conversion 108 are also integrated in component 301. The IC 301 defined in this way enables a radically simplified system design, which leads to reduced device costs due to the semiconductor technology used. In addition, integrated circuits 201, 301 can also be manufactured in packages, which eliminates the need for cost-intensive semiconductor bonding in the production process.

If significant cost savings can be achieved on the part of the semiconductor components through the change of technology, simplified system design and more cost-effective production, the extreme requirements in the field of level measurement bring with them technical challenges that must be overcome in order to enable the use of highly integrated chips (e.g., RSOC) in industrial level measurement devices. The key to solving the problems described above is the realization that, in contrast to the target markets of automotive and automation, static or extremely slowly changing reflective objects can regularly be assumed in the area of level measurement.

Figure 4A:
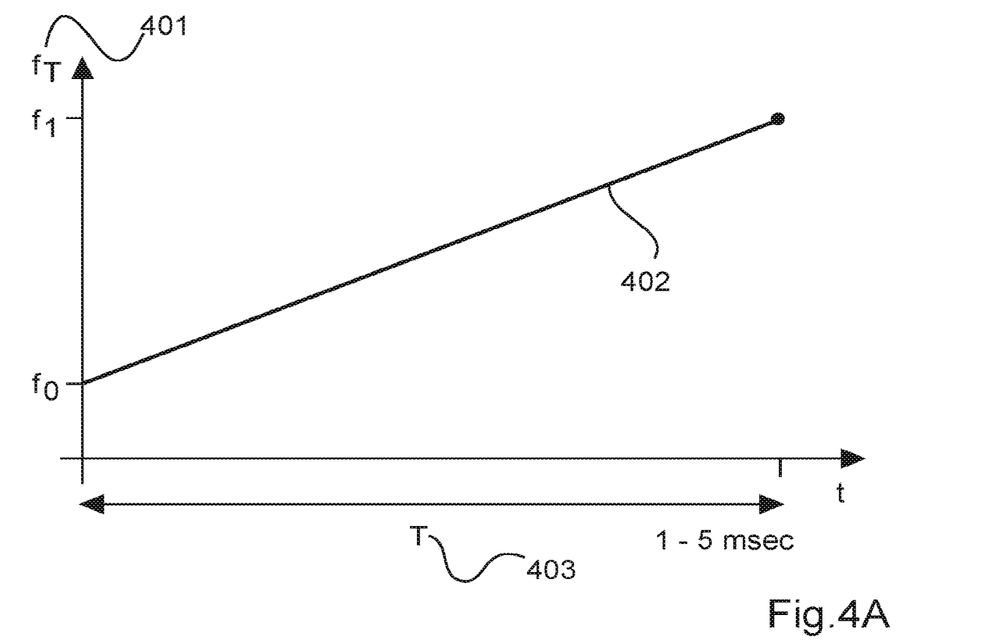
FIG. 4A shows a frequency sweep of a transmitted signal from a level radar.
Figure 4B:
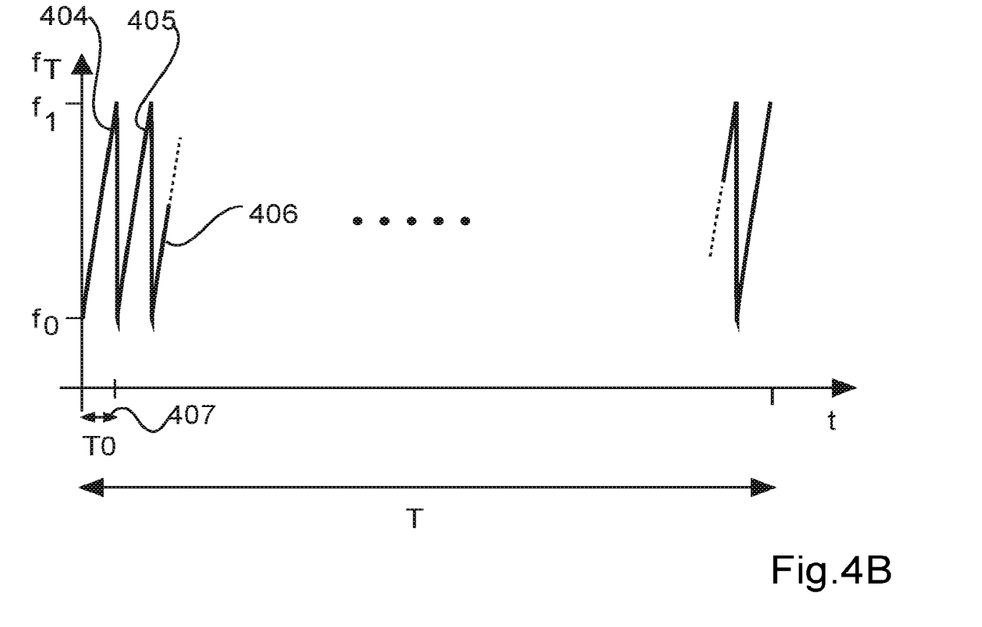
FIG. 4B shows a sequence of several frequency sweeps of a transmitted signal from a level radar.

FIG. 4A comparatively shows a first exemplary operating sequence for a level radar gauge 101 and FIG. 4B shows a typical operating sequence for a radar gauge 100 according to an embodiment of the invention.

In the operating sequence of FIG. 4A, the frequency 401 radiated by antenna 104 is typically modulated linearly from a start frequency f0 to a stop frequency f1 during a measurement run. Since this operating mode has been optimized for the measurement of static targets with simultaneous high requirements for the suppression of noise, this frequency sweep 402 is performed very slowly. Typical sweep times for the T 403 are in the range from 1 ms to 5 ms. The radar chips 201, 301 are developed by semiconductor manufacturers primarily for the observation of mobile targets. Consequently, only one operating mode with one or more directly successive individual sweeps 404, 405, 406 can be controlled via the control interface 203, 303. The duration T0 407 of such a single sweep is orders of magnitude smaller than that of the previous radar units. Typical values for the time T0 407 range from a few microseconds to several 100 microseconds. Operation of the radar unit with a single sweep of this type therefore leads, depending on the system, to an increase in the noise level of typically 20 to 30 dB. There is also the problem that the echo signals of successive sweeps 404, 405, 406 cannot be examined for echoes at the speed required for this.

The new radar units 100 are therefore equipped with a noise reduction device or unit 206, 303, the operation of which will be explained in more detail in FIGS. 5 and 6. It should be noted that the noise level reduction unit 206, 303 can be part of the evaluation processor 109 and can be implemented on it by software routines.

However, it may also be intended to implement the noise level reduction unit 206, 303 by means of one or more programmable logic devices (GAL, FPGA) or by a specialized ASIC directly as hardware circuit.

Figure 5:
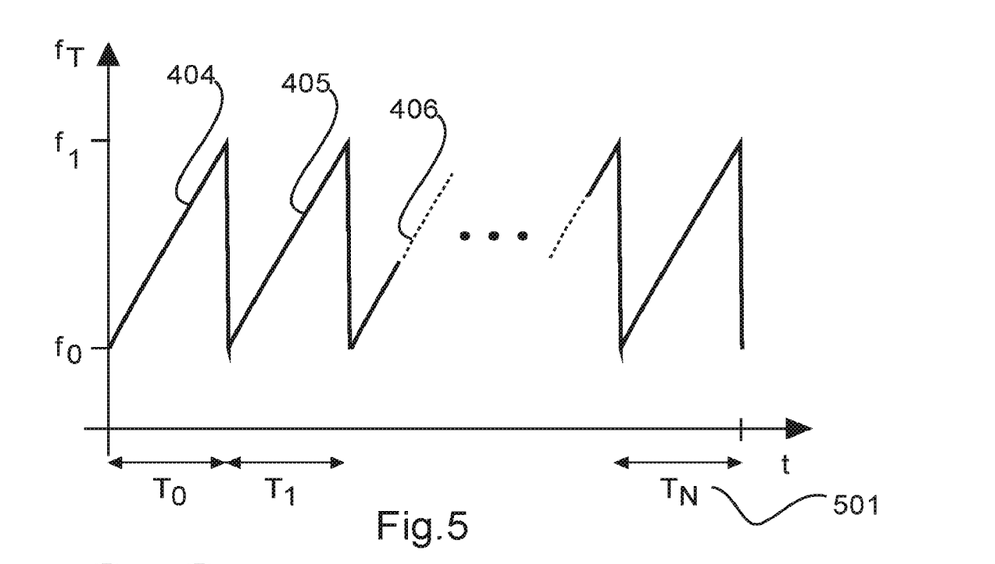
FIG. 5 shows several successive frequency sweeps of a transmission signal of a level radar unit.
Figure 6:
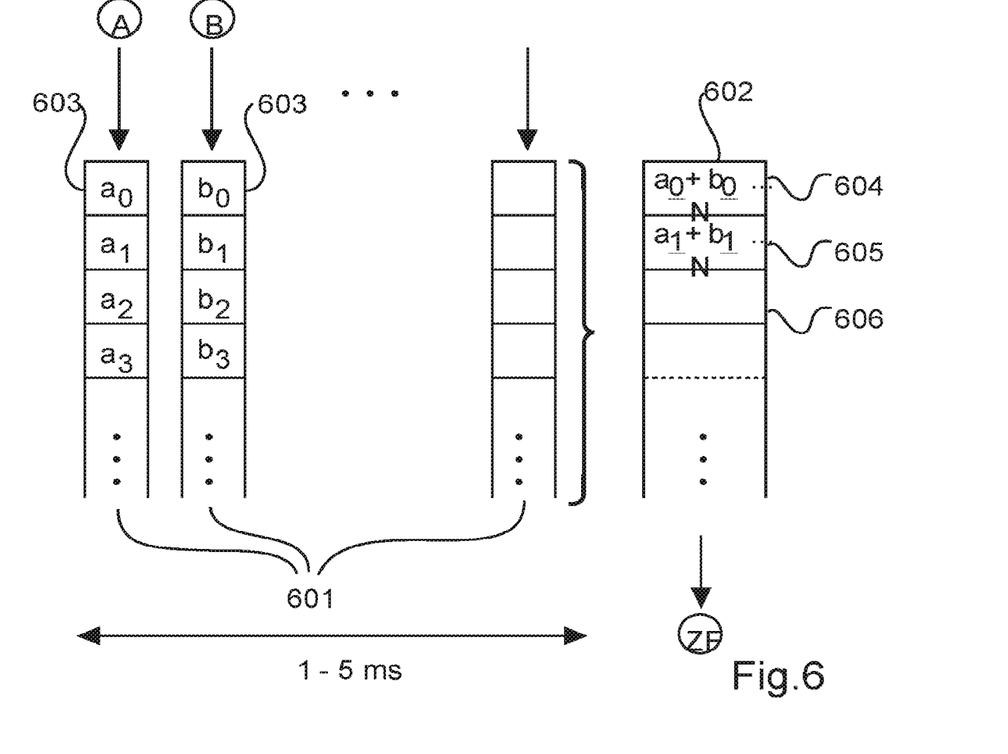
FIG. 6 shows an example of averaging.

FIG. 5 shows another exemplary operating sequence. The radar measuring instrument 100 emits a sequence of individual sweeps 404, 405, 406 in the direction of the product surface 105 and receives the digitized echo signals 207, 304 essentially simultaneously. The resulting digitized intermediate frequency signals 207, 304 are first stored in a memory area in the noise level reduction unit 206, 303. After completion of the high-frequency measurement at time 501, the data 601 in the memory are first logically grouped in such a way that the data acquired during a single sweep 404, 405, 406 are combined to form a group A, B, . . . . The averaging unit 206, 303 calculates a resulting averaging vector IF (602) from these subgroups by determining the arithmetic mean value 604 for the individual samples 603. It may be provided that the radar module 201, 301 is parameterized in such a way that the number of transmitted sweeps N 404, 405, 406 is equal to a power of two. The division by N required for each digit 604, 605, 606 to be determined can then be implemented in a particularly efficient manner by using a shift operation in a digital computing system. The resulting IF signal 602 can be further processed according to the known procedures, i.e., it can be converted into an echo curve, in particular by FFT, and examined for echoes and their position. Averaging reduces the noise level in the IF signal 602, which is essential for processing extremely small reflection signals. It may be intended to parameterize the radar chips 201, 301 in such a way that the duration of a cascade of single sweeps 404, 405, 406 essentially corresponds to the time span T 403 of current level measuring instruments.

However, due to the change in semiconductor technology from GaAs to SiGe/CMOS, it cannot be assumed that this measurement time 501 will result in a similarly low system noise as existing measurement devices 101. Another aspect of the invention therefore provides for an extended or alternative averaging mechanism to achieve a further reduction of the noise level. Since, in the environment of two-wire technology, the operation of power-hungry radar components always requires the use of an energy management unit, the method according to FIG. 7 also does justice to this aspect.

Figure 7:
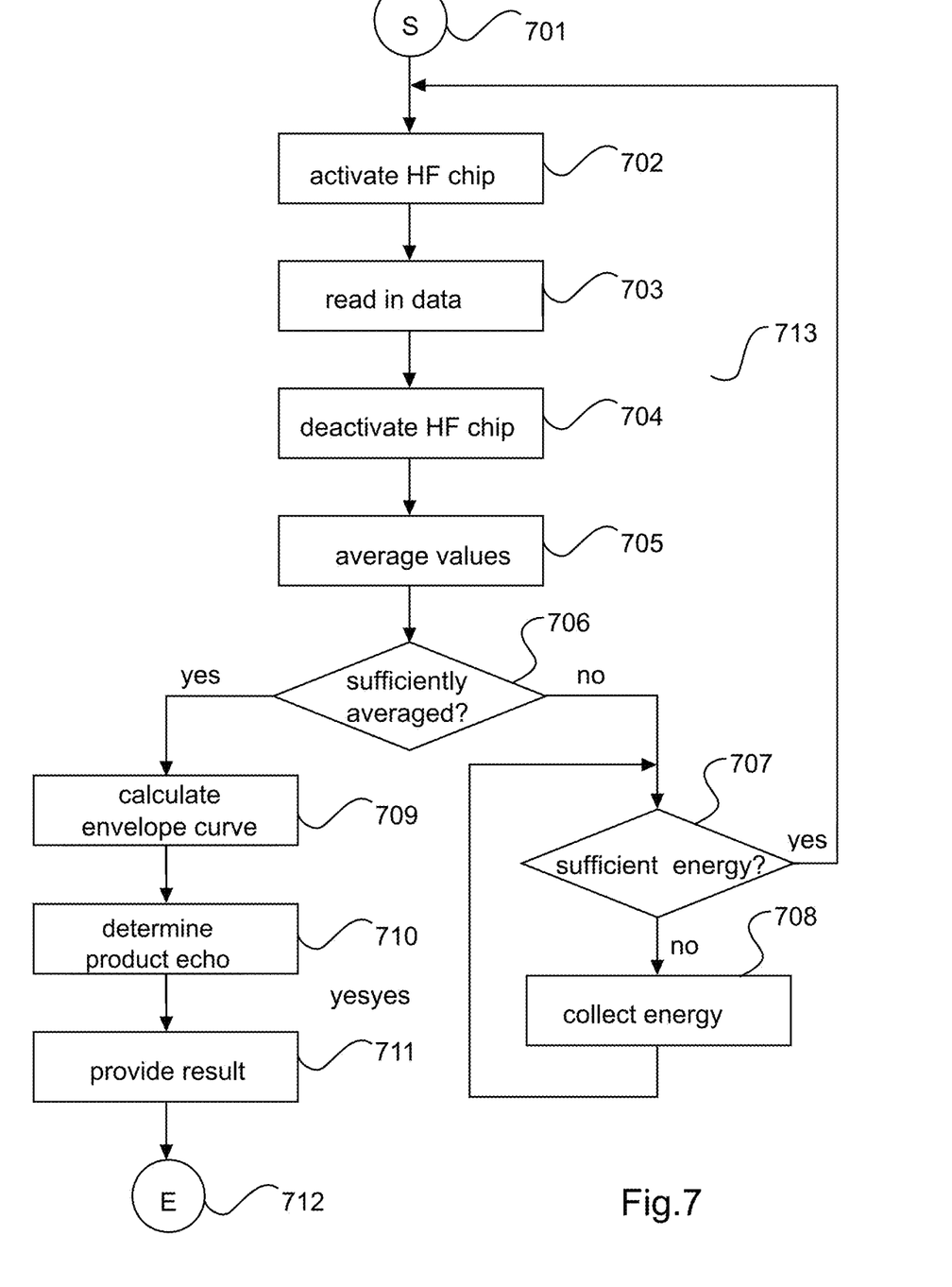
FIG. 7 shows a flow chart of a process according to an embodiment of the invention.

The modified measuring procedure starts in start state 701 with deactivated radar chip. In step 702, the radar chip 201, 301 is activated. This can be done by switching on the supply voltage of the chip and/or if necessary by writing a corresponding parameter sequence via interface 203, 305. In step 703, the radar chip sends at least one sequence 404, 405, 406 to sweeps, receives it again and processes it to an intermediate frequency signal which is detected by a noise level reduction unit 206, 303, if necessary by using an A/D converter 108. In step 704, the radar chip 201, 301 is deactivated again to save energy. In step 705, the detected intermediate frequency values 601, 603 are converted by the noise level reduction unit 206, 303 into a first averaged intermediate frequency signal 602 according to the procedure in FIG. 6.

In step 706, a check is made as to whether a predetermined noise suppression level has already been reached. If this is not the case, step 707 first checks whether there is sufficient energy in the sensor and here in particular in the power supply unit 110 to transmit a further radar signal detection sequence as shown in FIG. 5. In the event of a power deficit, step 708 is initially retained until sufficient power is available. Then the sensor begins to acquire further echo signals with step 702. As soon as sufficient echo curves have been averaged, it can be determined in step 706 that a specified noise suppression level has been reached. In step 709, the sensor proceeds to determine an echo curve from the resulting averaging curve 602 formed by several cycles 702 to 705 according to known procedures. In step 710, the product echo and its position within vessel 113 is also determined according to known methods. The measured value obtained in this way is made available to the outside in analog and/or digital form in step 711. The measuring procedure ends in condition 712. From the described sequence it is clear that, in the context of the use of highly integrated RSOC's within a level measuring instrument, continuous monitoring and control of the energy level in the sensor is generally necessary. The power supply unit 110 can be modified for this purpose and to directly instruct the processor 109 to set the radar chip 201, 301 with appropriate parameterization sequences into an energy-saving state. It can also be provided that the processor 109 takes over this control itself. It may also be provided that the radar chip 109 has a temperature sensor which is read by the processor. When a pre-settable maximum temperature is reached, if necessary taking into account the current ambient temperature and, if necessary, taking into account pre-set limit temperatures due to explosion protection requirements, the processor can deactivate the radar chip even if there is a sufficient energy level to lower the temperature within the 201, 301 block. This aspect can also be implemented application-specifically for use of the RSOC's in the level sensor.

Figure 8:
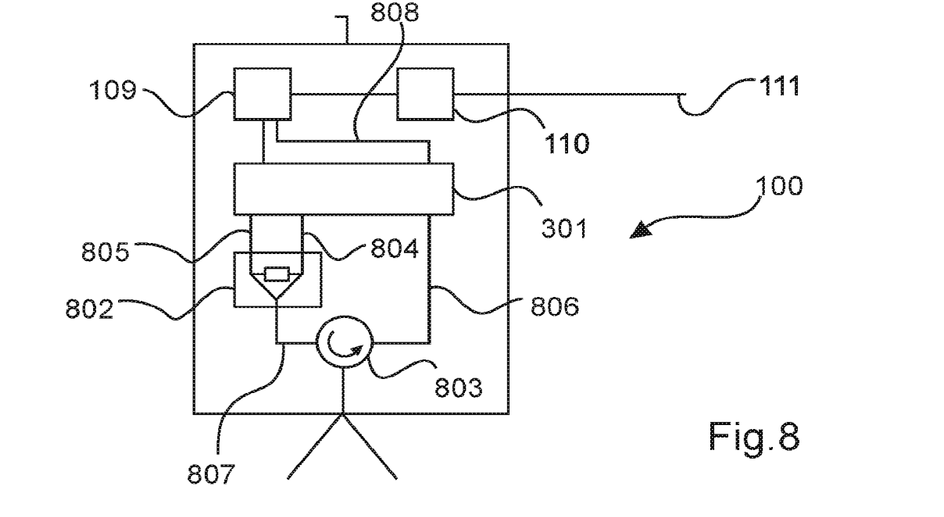
FIG. 8 shows a level measuring instrument according to an embodiment of the invention.

FIG. 8 shows a further version of a level measuring instrument 100. The sensor again has at least one radar chip 301, which is implemented in SiGe or CMOS technology. The maximum emitted power that can be generated in this technology is in principle lower than with the GaAs components used up to now. Due to the higher integration density, however, it is possible to implement several transmit channels 804, 805 and/or several receive channels 806 on one radar chip. It may also be possible to implement several transmit and/or receive channels 804, 805, 806 by installing several radar chips 301, which can still be economical due to the dramatically reduced system costs compared to the radar systems known to date. One aspect of the invention is now to link at least two of the transmitting channels 804, 805 and/or receiving channels 806 with each other by means of a signal level increasing device or unit 802. In the example in FIG. 8, two transmit channels 804, 805 are currently being combined with the aid of an inverse Wilkinson divider to form a resulting transmit signal 807. The two transmission channels 804, 805 must be controlled by setting corresponding control commands 808 in such a way that both transmission signals are active during a measuring cycle 404, 405. The combined signal 807 is forwarded to the antenna with almost double the power via the transmit-receive switch 803. By the described measure it can be achieved that the transmitted signal reaches a level which is equal or higher than the level of the transmitted signal of known level sensors 101. The Wilkinson divider shown in FIG. 8 can alternatively be replaced by a balun realized in microstrip line technology, whereby the control 808 is then carried out in such a way that the two transmitted signals 804, 805 are generated with a 90° phase shift. It can also be planned to omit the transmitting and receiving switch 803 and to realize the level measuring instrument with separate transmitting and receiving antennas. In addition or alternatively, it can be intended to detect the reflected signals with several channels if several receiving channels are available, and to realize the signal level increasing unit on the digital signal processing side in software or programmable logic.

Figure 9:
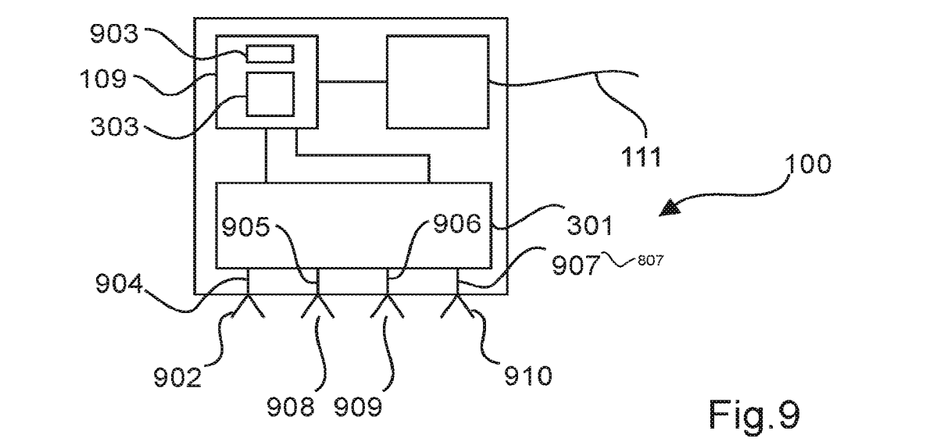
FIG. 9 shows a level measuring instrument according to a further embodiment of the invention.

FIG. 9 shows an application of the invention in the context of a level measuring instrument 100 which detects the topology of a product. The radar chip 109 has several transmitting and/or receiving channels connected to antennas 902. The control processor 109 has a noise level reduction unit 303 which during several measuring cycles 404, 405, 406 averages the echo signals converted by the receiving channels in RSOC 301. In this way, the noise of the signals is reduced. If this has fallen below a pre-settable value, the noise-reduced signals are forwarded to a beam forming unit 903, which in conjunction with algorithms for digital beam forming can determine the topology of a bulk material surface 105.

Figure 10:
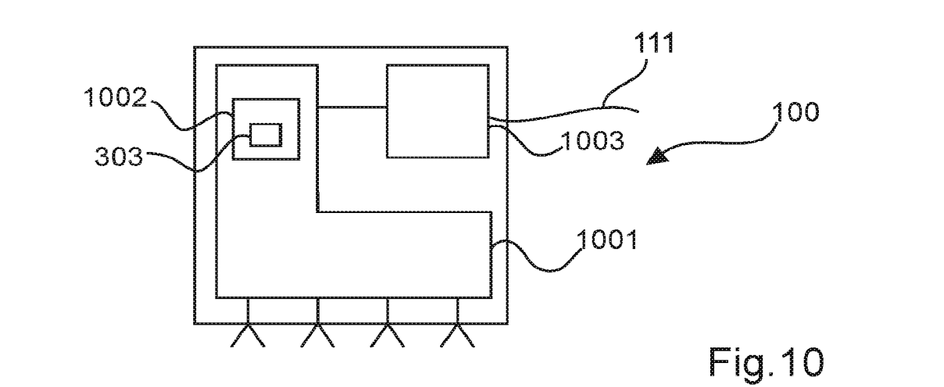
FIG. 10 shows a level measuring instrument according to a further embodiment of the invention.

FIG. 10 shows a further development with a highly integrated RSOC 1001, which combines the functional units of the 301 radar chip with the functionality of a 1002 calculator. Within the arithmetic unit 1002, a noise level reduction unit 303 is implemented, which compensates for the semiconductor technology deficits with respect to noise. In order to meet the requirements of limited conduction, a modified power supply unit 1003 is provided which provides a larger energy storage than previous power supply units 110. Thus, the RSOC unit 1001 can be continuously activated over several sweeps 405, 406, 407 and, if necessary, several measurement cycles 713, and only deactivated after a measured value has been determined. The memory contents of averaging unit 303 are lost in the deactivated state, but the current measured value can still be signaled externally by power supply unit 1003.

Figure 11:
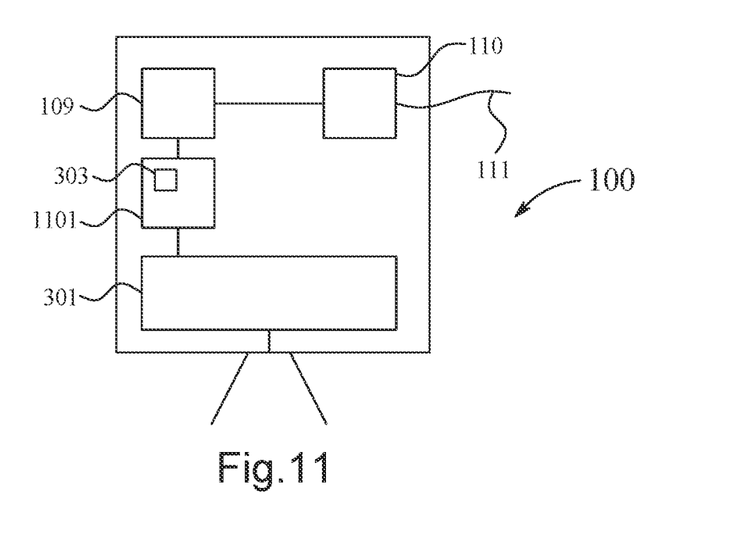
FIG. 11 shows a level measuring instrument according to a further embodiment of the invention.

FIG. 11 shows another embodiment of a level meter 100, where a low-power FPGA 1101 is provided between the processor unit 109 and the radar chip 301, which is supplied with an external operating clock during a period of time when the radar chip 301 is active, and can thus implement the functionality of the noise level reduction unit 303. When averaging over several measurement cycles 713, the processor 109 can change to an energy-saving state, and the procedure is implemented by the low-power FPGA. During any necessary pauses 708, only the clock supply is removed from the FPGA, which massively reduces its power consumption, but keeps the partially averaged measurement values 601, 603 in the memory of the FPGA.

Figure 12:
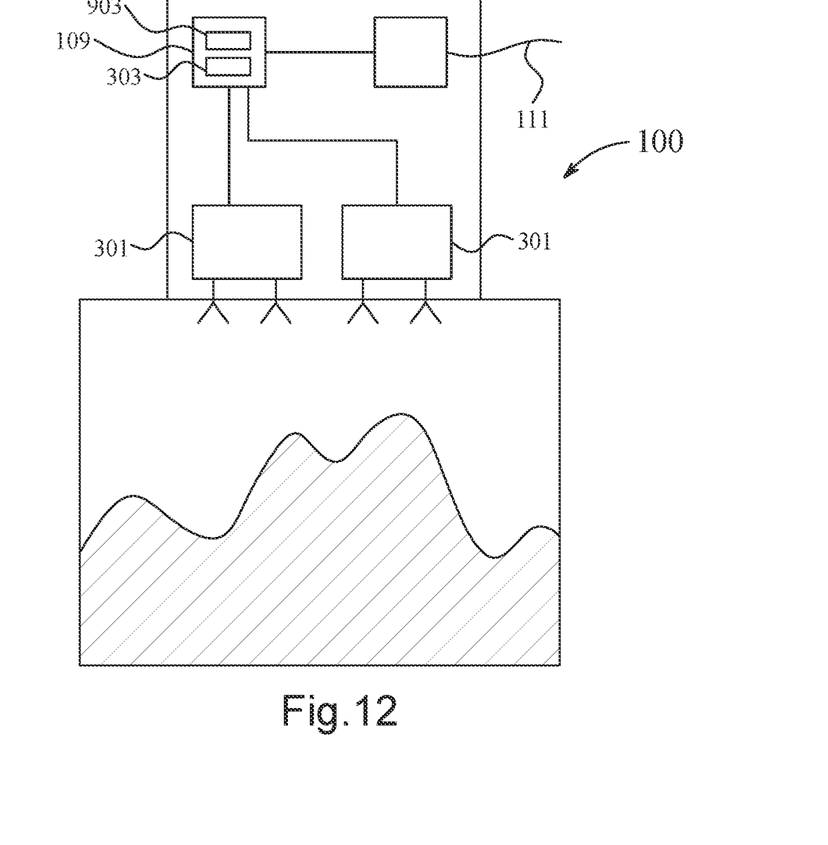
FIG. 12 shows a level measuring instrument with a container according to another embodiment of the invention.

FIG. 12 shows a level measuring instrument 100 detecting the topology according to the diagram in FIG. 9, but it differs from the previously shown version by the installation of a large number of radar chips 301, which contributes to an enlargement of the aperture of the effectively effective antenna after completion of the digital beam forming and thus to an improved imaging quality of the measuring instrument.

Thus a level measuring device with at least one low-cost integrated radar chip is provided, which has a device for increasing the signal-to-noise ratio of these components, a device for reducing the energy consumption of these components, and/or a device for limiting the heating of the circuits.

An embodiment of the invention can be seen in the fact that the level measuring device for level and/or topology detection comprises at least one radar module (RSOC), wherein the radar module comprises at least one integrated analog-to-digital converter for providing digitized intermediate frequency signals, and wherein the level measuring device comprises at least one noise level reduction device and/or a signal level increasing device and/or an energy management device.

Figure 13:
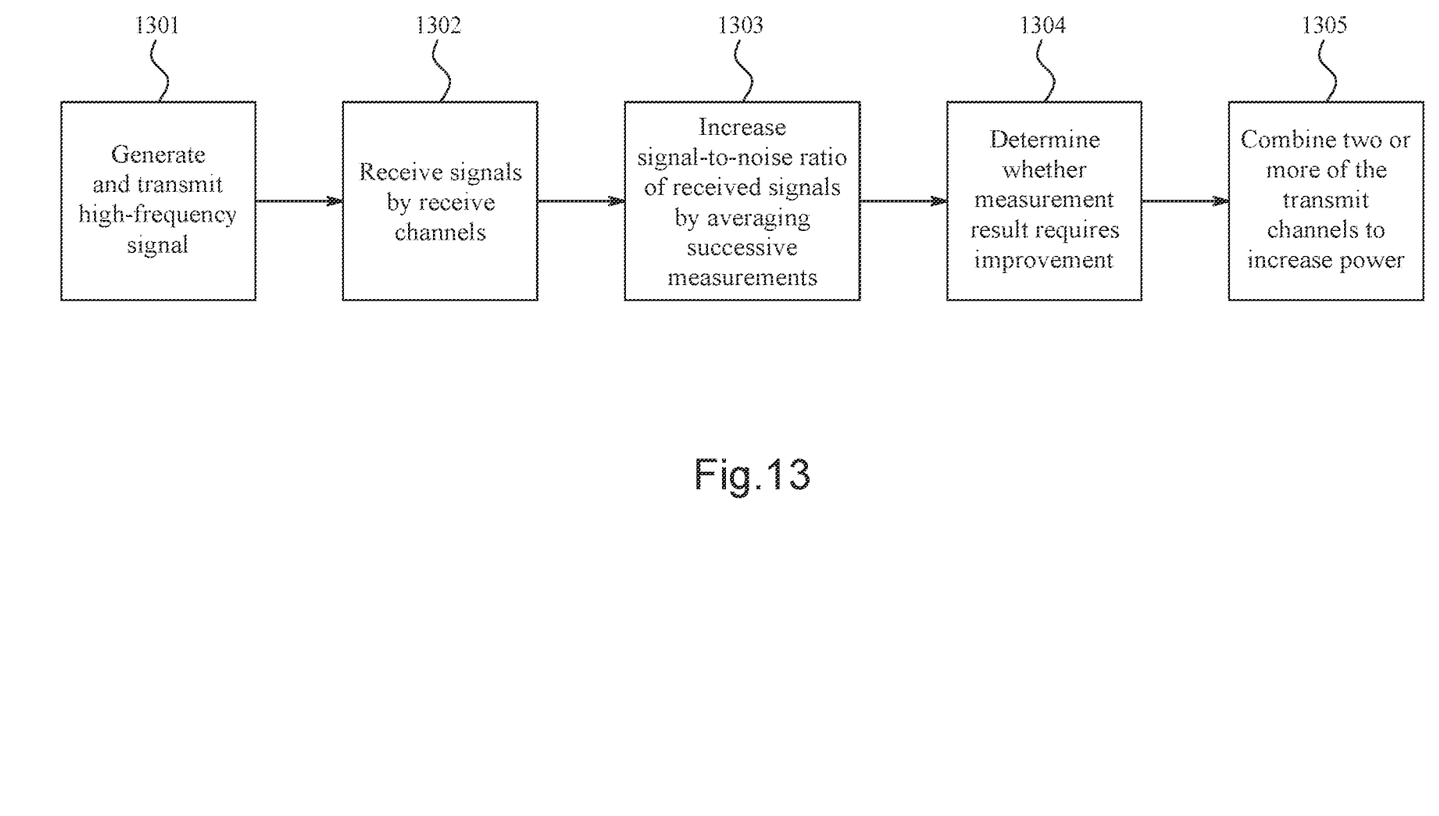
FIG. 13 shows a flow chart of a process according to an embodiment of the invention.

FIG. 13 shows a flow chart of a process according to an embodiment of the invention. In step 1301, each of a plurality of transmission channels generates a high-frequency transmission signal which is transmitted in each case. In step 1302, the corresponding receive signals are received by several receive channels. These steps can be performed by a radar system-on-chip. In step 1303, the signal-to-noise ratio of one or all received signals is increased by averaging the results of several measurements carried out in succession. In particular, provision may be made for averaging the digitised intermediate frequency signals of successive measurements. Each measurement shall be performed by ramping the transmitted signal through a frequency ramp. In step 1304, it is determined that the measurement result is in need of improvement, and in step 1305, two or more of the transmit channels are combined to increase the power of the resulting combined transmit channel.

In addition, it should be noted that "comprising" and "having" does not exclude other elements or steps and the indefinite articles "an" or "a" do not exclude a plurality. It should also be noted that features or steps described with reference to one of the above examples of execution may also be used in combination with other features or steps of other examples of execution described above. Reference numerals in the claims are not to be considered as restrictions.

The invention claimed is:

1. A level measuring instrument configured as a frequency-modulated continuous-wave signal level measuring device, the level measuring instrument comprising:
   a microwave integrated circuit in a form of a radar system on chip with at least two transmission hardware channels, each configured to generate a transmission signal, and at least two receiving hardware channels, each configured to receive the transmission signal reflected from a product surface, wherein an antenna is connected to at least two of the transmission hardware channels;
   a noise level reduction device being configured to
      increase a signal-to-noise ratio of a received signal, which relates to the transmitted signals reflected from the product surface, by averaging results of several measurements carried out in succession in time,
         wherein each of the measurements carried out in succession in time comprises a frequency sweep and the results comprise a plurality of data acquired during each single frequency sweep, and
      determine, after averaging the results of the several measurements carried out in succession in time, whether the signal-to-noise ratio of a received signal is above a threshold and to trigger further measurements, results of which are also fed to the averaging, if the signal-to-noise ratio of a received signal is not above the threshold; and
   a signal level increasing device being configured to combine, by means of an inverse Wilkinson divider, two of the at least two transmission hardware channels to produce a combined transmission signal with increased power or to combine two of the receiving hardware channels to produce a combined reception signal with increased power.

2. The level measuring instrument according to claim 1, wherein the microwave integrated circuit comprises at least one integrated analog-to-digital converter, configured to convert a received signal into a digitized intermediate frequency signal which is due to one or more reflected transmitted signals from the product surface.

3. The level measuring instrument according to claim 1, wherein the microwave integrated circuit is based on BiCMOS technology.

4. The level measuring instrument according to claim 1, wherein the microwave integrated circuit is based on SiGe technology.

5. The level measuring instrument according to claim 1, wherein the microwave integrated circuit is based on HF-CMOS technology and comprises circuit parts configured for frequencies of 75 GHz or more.

6. The level measuring instrument according to claim 1, further comprising a processor and a temperature sensor, which is configured to be read out by the processor, wherein when a predetermined maximum temperature is reached, the processor is configured to deactivate the microwave integrated circuit even if a sufficient energy level is present to lower a temperature within the microwave integrated circuit.

7. The level measuring instrument according to claim 1, the level measuring instrument being further configured to detect a topology of a medium in a vessel.

8. A method for measuring a level of a medium in a container or a topology of a surface of the medium, by means of a frequency-modulated continuous-wave signal level measuring instrument, the method comprising the steps of:
- generating a transmission signal, the generated transmission signal having a frequency in a range of 6 GHz with each of two transmission hardware channels, wherein an antenna is connected to at least two of the transmission hardware channels;
- receiving the transmission signal reflected from a product surface with at least two receiving hardware channels;
- increasing a signal-to-noise ratio of a received signal, which relates to the transmitted signals reflected from the product surface, by averaging results of several measurements carried out in succession, wherein each of the measurements carried out in succession in time comprises a frequency sweep and a plurality of data acquired during each single frequency sweep,
- determining, after averaging the results of the several measurements carried out in succession in time, whether the signal-to-noise ratio of a received signal is above a threshold, and triggering further measurements, results of which are also fed to the averaging, if the signal-to-noise ratio of a received signal is not above the threshold; and
- combining, by means of an inverse Wilkinson divider, the two transmission hardware channels to produce a combined transmission signal with increased power or combining two of the receiving hardware channels to produce a combined reception signal with increased power.

9. A nontransitory computer-readable storage medium having a program stored therein, which, when executed on a processor of a level measuring device, instructs the level measuring device to perform the steps of the method according to claim 8.

10. A method for measuring a level of a medium in a container or a topology of a surface of the medium, by means of a frequency-modulated continuous-wave signal level measuring instrument, the method comprising the steps of:
- generating a transmission signal having a frequency in a range of 24 GHz with each of two transmission hardware channels, wherein an antenna is connected to at least two of the transmission hardware channels;
- receiving the transmission signal reflected from a product surface with at least two receiving hardware channels;
- increasing a signal-to-noise ratio of a received signal, which relates to the transmitted signals reflected from the product surface, by averaging results of several measurements carried out in succession, wherein each of the measurements carried out in succession in time comprises a frequency sweep and a plurality of data acquired during each single frequency sweep,
- determining, after averaging the results of the several measurements carried out in succession in time, whether the signal-to-noise ratio of a received signal is above a threshold, and triggering further measurements, results of which are also fed to the averaging, if the signal-to-noise ratio of a received signal is not above the threshold; and
- combining, by means of an inverse Wilkinson divider, the two transmission hardware channels to produce a combined transmission signal with increased power or combining two of the receiving hardware channels to produce a combined reception signal with increased power.

11. A method for measuring a level of a medium in a container or a topology of a surface of the medium, by means of a frequency-modulated continuous-wave signal level measuring instrument, the method comprising the steps of:
- generating a transmission signal having a frequency a range of between 75 GHz and 85 GHz with each of two transmission hardware channels, wherein an antenna is connected to at least two of the transmission hardware channels;
- receiving the transmission signal reflected from a product surface with at least two receiving hardware channels;
- increasing a signal-to-noise ratio of a received signal, which relates to the transmitted signals reflected from the product surface, by averaging results of several measurements carried out in succession, wherein each of the measurements carried out in succession in time comprises a frequency sweep and a plurality of data acquired during each single frequency sweep,
- determining, after averaging the results of the several measurements carried out in succession in time, whether the signal-to-noise ratio of a received signal is above a threshold, and triggering further measurements, results of which are also fed to the averaging, if the signal-to-noise ratio of a received signal is not above the threshold; and
- combining, by means of an inverse Wilkinson divider, the two transmission hardware channels to produce a combined transmission signal with increased power or combining two of the receiving hardware channels to produce a combined reception signal with increased power.

* * * * *